United States Patent
Zhang et al.

(10) Patent No.: US 12,487,090 B2
(45) Date of Patent: Dec. 2, 2025

(54) MAP MERGING METHOD FOR ELECTRONIC APPARATUS

(71) Applicants: AGENCY FOR DEFENSE DEVELOPMENT, Daejeon (KR); SEOUL NATIONAL UNIVERSITY R&DB FOUNDATION, Seoul (KR)

(72) Inventors: Byoung Tak Zhang, Seoul (KR); Dong Sig Han, Seoul (KR); Hyun Do Lee, Seoul (KR); Jae In Kim, Seoul (KR); Gang Hun Lee, Seoul (KR); Yoon Sung Kim, Seoul (KR)

(73) Assignees: AGENCY FOR DEFENSE DEVELOPMENT, Daejeon (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 165 days.

(21) Appl. No.: 17/960,253

(22) Filed: Oct. 5, 2022

(65) Prior Publication Data
US 2023/0118831 A1   Apr. 20, 2023

(30) Foreign Application Priority Data
Oct. 5, 2021   (KR) .................. 10-2021-0131814

(51) Int. Cl.
*G01C 21/32* (2006.01)
*G01C 21/00* (2006.01)
(Continued)

(52) U.S. Cl.
CPC ......... *G01C 21/32* (2013.01); *G01C 21/3833* (2020.08); *G01C 21/387* (2020.08);
(Continued)

(58) Field of Classification Search
CPC .................................................. G01C 21/32
See application file for complete search history.

(56) References Cited

U.S. PATENT DOCUMENTS

| 2020/0116493 A1 | 4/2020 | Colburn et al. |
| 2021/0004021 A1* | 1/2021 | Zhang .................. G06T 19/00 |

(Continued)

FOREIGN PATENT DOCUMENTS

| KR | 10-2019-0073719 A | 6/2019 |
| KR | 10-1976241 B1 | 8/2019 |

(Continued)

OTHER PUBLICATIONS

Sajad Saeedi et al., "Neural Network-based Multiple Robot Simultaneous Localization and Mapping," 2011 IEEE/RSJ International Conference on Intelligent Robots and Systems, pp. 880-885 (Sep. 25-30, 2011).

(Continued)

*Primary Examiner* — Imran K Mustafa
(74) *Attorney, Agent, or Firm* — MILES & STOCKBRIDGE P.C.

(57) ABSTRACT

A map merging method for an electronic apparatus which includes: obtaining information about a first local map of a first apparatus, a pose of the first apparatus in the first local map, a second local map of a second apparatus, a pose of the second apparatus in the second local map, and an image of the second apparatus obtained by the first apparatus; identifying a relative pose of the second apparatus relative to the first apparatus from the image using a first trained artificial neural network; transforming the second local map to correspond to the first local map based on the relative pose, the pose of the first apparatus, and the pose of the second apparatus; and merging the first local map and a transformed second local map transformed in the transforming the second local map to output a merged map is provided.

15 Claims, 5 Drawing Sheets

(51) Int. Cl.
  *G06N 3/045* (2023.01)
  *G06N 3/08* (2023.01)
  *G06V 10/82* (2022.01)

(52) U.S. Cl.
  CPC ............... *G06N 3/045* (2023.01); *G06N 3/08* (2013.01); *G06V 10/82* (2022.01)

(56) References Cited

U.S. PATENT DOCUMENTS

| | | | |
|---|---|---|---|
| 2021/0063200 A1* | 3/2021 | Kroepfl | C03C 17/3644 |
| 2021/0187391 A1 | 6/2021 | Ekkati et al. | |
| 2021/0342686 A1* | 11/2021 | Kothari | G06N 3/045 |
| 2022/0343537 A1* | 10/2022 | Taamazyan | G06V 10/82 |

FOREIGN PATENT DOCUMENTS

| | | |
|---|---|---|
| KR | 20210057402 A | 5/2021 |
| WO | 2020190387 A1 | 9/2020 |

OTHER PUBLICATIONS

Pascal Vincent et al., "Extracting and Composing Robust Features with Denoising Autoencoders," Proceedings of the 25th International Conference on Machine Learning (2008).

Notice of Preliminary Rejection dated Jun. 25, 2023 issued in corresponding Korean Application No. 10-2023-0131814.

Notice of Allowance issued on Jan. 26, 2024 in corresponding Korean Application No. 10-2021-0131814.

Sebahattin Topal, et al., "A Novel Map Merging Methodology for Multi-Robot Systems", Proceedings of the World Congress on Engineering and Computer Science 2010, vol. 1, pp. 383-387, Oct. 20-22, 2010.

* cited by examiner

FIG. 4

| Algorithm 1: Relative pose estimation map merging system |
|---|

401 — Input: $M_0, M_1, \theta_0, \theta_1, I$
402 — Output: $\hat{M}$
S410 — 1: $\pi \leftarrow PoseEstimation(I)$ //Relative pose estimation model
S420 — 2: $T \leftarrow \theta_0 \pi (\theta_1)^{-1}$ //Transforming from $M_1$ to $M_0$
S430 — 3: $\tilde{M}_1 \leftarrow T(M_1)$
S440 — 4: $\phi \leftarrow OrientationError(M_0, \tilde{M}_1)$ //Rotation error estimation model
S450 — 5: $\tilde{M}_1 \leftarrow \phi^{-1}(\tilde{M}_1)$
S460 — 6: Merging $M_0$ and $\tilde{M}_1$ as $\tilde{M}$
S470 — 7: $\hat{M} \leftarrow DenoisingAutoencoder(\tilde{M})$ //Noise removal model
S480 — 8: retutn $\hat{M}$

MAP MERGING METHOD FOR ELECTRONIC APPARATUS

TECHNICAL FIELD

The embodiments of present disclosure generally relate to a map merging method for an electronic apparatus.

DESCRIPTION OF THE RELATED ART

Most of map merging techniques for platoon robots in the related art are approaches to process maps received from robots using a traditional computer-vision feature extraction algorithm to find out regions mapped to each other in the maps, and find an optimal transformation between the maps. Such techniques in the related art have a limitation in that a merged map may be obtained only when individual maps of the robots have a common region in which specific portions of the individual maps are enough to overlap each other.

To overcome the limitation of the approach to extract features from a map image, it is necessary to use pose information of the robot. However, the techniques in the related art have hardware limitations such as providing pieces of initial absolute coordinate information of the robots to set the assumption that does not match the actual situation, or using a special sensor equipment to estimate the relative pose between the robots.

SUMMARY OF THE INVENTION

According to an aspect, there is provided a map merging method for an electronic apparatus in which a relative pose between both apparatuses may be obtained using an artificial neural network based on an image of another apparatus captured by one apparatus, and maps created by the both apparatuses may be merged to each other based on the relative pose, which makes it possible to merge the maps created by a plurality of apparatuses to each other.

Technical matters achieved in the present disclosure are not limited to the technical matters described above, and other technical matters will be inferred from the following example embodiments.

According to an aspect, a map merging method in an electronic apparatus, a map merging method for an electronic apparatus may include: obtaining information about a first local map of a first apparatus, a pose of the first apparatus in the first local map, a second local map of a second apparatus, a pose of the second apparatus in the second local map, and an image of the second apparatus obtained by the first apparatus; identifying a relative pose of the second apparatus relative to the first apparatus from the image using a first trained artificial neural network; transforming the second local map to correspond to the first local map based on the relative pose, the pose of the first apparatus, and the pose of the second apparatus; and merging the first local map and a transformed second local map transformed in the transforming the second local map to output a merged map.

According to an aspect, an electronic apparatus may include a memory storing at least one program, and a processor configured to execute the at least one program to: obtain information about a first local map of a first apparatus, a pose of the first apparatus in the first local map, a second local map of a second apparatus, a pose of the second apparatus in the second local map, and an image of the second apparatus obtained by the first apparatus; identify a relative pose of the second apparatus relative to the first apparatus from the image using a first trained artificial neural network; transform the second local map to correspond to the first local map based on the relative pose, the pose of the first apparatus, and the pose of the second apparatus; and merge the first local map and a transformed second local map transformed in the transforming the second local map to output a merged map.

According to an aspect, a non-transitory computer-readable medium may include a memory that stores a program for causing a computer to execute the operations described above.

Other specific details of other example embodiments are included in the detailed description and the drawings.

A map merging method and an electronic apparatus according to the embodiments of the present disclosure is capable of estimating a relative pose of another robot with respect to one robot from an image obtained by a universal red-green-blue (RGB) camera rather than a special sensor, regardless of an area of a common area between partial maps to be merged.

According to the various embodiments of the present disclosure, when robot agents perform a search scenario in a simulation environment, the computation cost is not so large that a system developed by a computer using one graphics processing unit (GPU) may be operated in real time. This makes it possible to achieve a significant improvement of performance for cost.

Effects are not limited to the aforementioned effects, and other effects not mentioned will be clearly understood by those skilled in the art from the description of the claims.

BRIEF DESCRIPTION OF THE DRAWINGS

FIG. 4 illustrates an algorithm according to an example embodiment of the present disclosure.

DETAILED DESCRIPTION OF THE INVENTION

Figure 1:
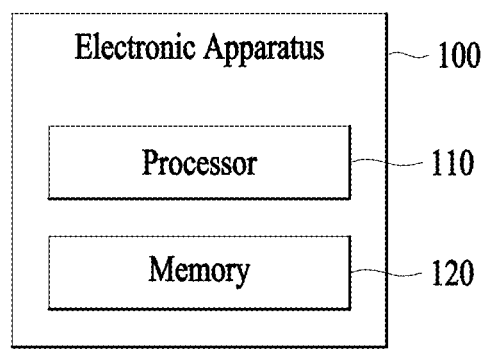
FIG. 1 illustrates an electronic apparatus according to the present disclosure.

Example embodiments of a technology described herein are not intended to limit the scope of the present disclosure but are merely examples. Those skilled in the art may design various alternative example embodiments without departing the scope of the present disclosure defined by the appended claims. Terms used in example embodiments are general terms that are currently widely used while their respective functions in the present disclosure are taken into consideration. However, the terms may be changed depending on the intention of one of ordinary skilled in the art, legal precedents, emergence of new technologies, and the like. Also, in particular cases, terms that are arbitrarily selected by the applicant of the present disclosure may be used. In this case, the meanings of these terms may be described in detail in the corresponding disclosure. Accordingly, the terms used herein should be defined based on the meanings thereof and the content throughout the specification, rather than a simple name of the term.

Expressions in the singular form used herein should be understood to encompass expressions in the plural form unless the context clearly indicates otherwise.

When a part "includes" a constituent element(s) or an operation(s) through the specification, this means that the part is not intended to necessarily include all the constituent element(s) or the operation(s), and may further include the constituent elements, rather than excluding constituent elements other than those described in the claims and the specification, unless other specified.

Further, although the terms including ordinal numbers such as a first, a second and the like used herein may be used to describe various constituent elements, such constituent elements should not be limited by terms including the ordinal numbers. The above terms may be used to distinguish a constituent element from another constituent element in a description of the specification in context. For example, a first constituent element may be named as a second constituent element in another description of the specification without departing from the scope of the present disclosure. Conversely, the second constituent element may be named as the first constituent element in another description of the specification.

The terms "mechanism," "element," "means," and "configuration" used herein may be used broadly and are not limited to mechanical or physical example embodiments. These terms may include meaning of a series of routines of software in association with a processor.

In this specification (in particular, the claims), the word "above" and similar directives may be used to include the singular form or the plural form. In addition, when the word "range" is described herein, the range may be understood to include individual values in the range (unless otherwise specified). In the detailed description, each individual value constituting the range may be understood to be merely described. In addition, respective operations constituting a method described herein may not be necessarily performed in the order of the respective operations, but may be performed while being rearranged in a suitable sequence unless the context clearly dictates a specific sequence, or unless otherwise specified. Further, all examples or exemplary terms (for example, "and (or) the like") may be used for the purpose of merely specifically describing the technical spirit and the scope of the present disclosure is not limited to the above examples or exemplary terms unless they are limited by the claims. Those skilled in the art may add various modification, combinations and variations to example embodiments described in this specification according to design conditions and factors, and may implement another example embodiments that fall within the scope of the claims or the range of equivalents thereof.

Example embodiments of the present disclosure will be described below with reference to the drawings.

FIG. 1 illustrates a simplified exemple block diagram of an electronic apparatus 100 that may be used to implement at least one example embodiment of the present disclosure. In various example embodiments, the electronic apparatus 100 may be used to implement any system or method described in the present disclosure. For example, the electronic apparatus 100 may be configured to be used as any electronic apparatus including a data server, a web server, a portable computing apparatus, a personal computer, a tablet computer, a workstation, a mobile phone, a smart phone, or any other apparatus described below.

The electronic apparatus 100 may include a memory 120, and one or more processors 110 provided with one or more cache memories and memory controllers which may be configured to communicate with the memory 120. Further, the electronic apparatus 100 may include other apparatuses that may be connected to the electronic apparatus 100 via one or more ports (for example, a universal serial bus (USB), a headphone jack, a lightening connector, a thunderbolt connector, and the like). The apparatus that may be connected to the electronic apparatus 100 may include a plurality of ports configured to receive a fiber optic connector. The configuration of the electronic apparatus 100 illustrated herein may be considered merely as a specific example for the purpose of illustrating preferred example embodiments of the apparatus. Thus, as will be understood by those skilled in the art, in addition to the constituent elements included in the electronic apparatus 100, other general-purpose constituent elements may be further included in the electronic apparatus 100.

The processor 110 may be used to cause the electronic apparatus 100 to provide operations or functions in an example embodiment described in the present disclosure. For example, the processor 110 executes programs stored in the memory 120 of the electronic apparatus 100 to control the overall operation of the electronic apparatus 100. The processor 110 may be implemented with a central processing unit (CPU), a graphics processing unit (GPU), an application processor (AP), and the like, but not limited thereto.

The memory 120 is hardware for storing various pieces of data processed in the electronic apparatus 100. The memory 120 may store pieces of data processed and to be processed by the processor 110 of the electronic apparatus 100. Further, the memory 120 may store not only a basic programming and a data structure that is configured to provide the functionality of at least one example embodiment of the present disclosure but also applications (programs, code modules, instructions), drivers, and the like that are configured to the functionalities of example embodiments of the present disclosure. The memory 120 may include, for example, a random-access memory (RAM) such as a dynamic random-access memory (DRAM), a static random-access memory (SRAM) or the like, a read-only memory (ROM), an electrically erasable programmable read-only memory (EEPROM), a compact disc read-only memory (CD-ROM), a Blu-ray or other optical disk storage, a hard disk drive (HDD), a solid-state drive (SSD), or a flash memory.

Figure 2:
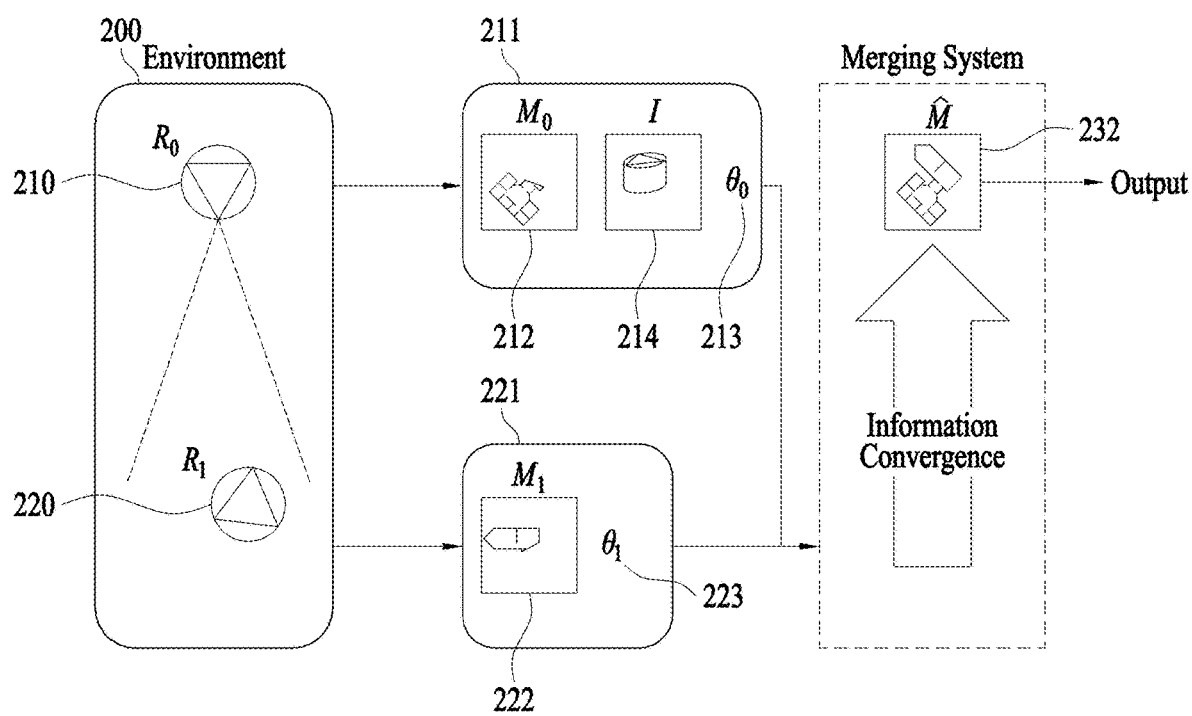
FIG. 2 illustrates a schematic environment in which the present disclosure is used.

FIG. 2 illustrates an environment in which a map merging method according to the present disclosure may be used.

An environment 200 may be a two-dimensional or three-dimensional space used to create, as a map, information about obstacles or terrains that exist in the environment 200. A first apparatus 210 and a second apparatus 220 are movable inside the environment 200 to sense an obstacle or terrain that presents in the environment 200, and may create a local map of the environment 200.

Each of the first apparatus 210 and the second apparatus 220 may be provided with a moving part capable of moving around itself, or may include a first platform and a second platform in which the moving part is provided. The first apparatus and the second apparatus, or the first platform and the second platform, which include the moving part, may be all types of known vehicles as a manned/unmanned vehicle, a robot, and the like. For example, the vehicle may be a robotic cleaner, a passenger car, a military vehicle, or the like. However, the vehicle is not limited to only the vehicle that utilizes wheels. As another example, the vehicle may be equipped with all types of known moving part, such as a legged robot or a walking robot that utilizes legs, a ship, and the like.

Each of the first apparatus 210 and the second apparatus 220 may use at least one range sensor to create a map. The range sensor may sense an obstacle, a terrain, or the like that presents in the environment 200, to which the first apparatus 210 or the second apparatus 220 may not be accessible. In an example embodiment, the range sensor may be a sensor configured to measure a distance to the obstacle or terrain. For example, the range sensor may be a known distance measuring sensor such as a light detection and ranging (LIDAR) sensor, a laser detection and ranging (LADAR) sensor, an image sensor, a stereo camera, an optical sensor, an infrared sensor, and the like, or a combination thereof.

The first apparatus 210 and the second apparatus 220 may use at least one pose (or attitude) measuring sensor to create a map. The pose (or attitude) measuring sensor may measure a distance the first apparatus 210 or the second apparatus 220, or the platform on which the respective apparatus is mounted, has moved from a reference pose, a rotation angle of the first apparatus 210 (or the second apparatus 220) or the platform from a reference attitude, or the like. That is, the first apparatus 210 and the second apparatus 220 may use the pose (or attitude) measuring sensor to measure a pose 213 of the first apparatus 210 and a pose 223 of the second apparatus 220. The pose (or attitude) measuring sensor may be a known pose (or attitude) measuring sensor, such as an accelerometer, a gyroscope or gyro sensor, a global positioning system (GPS) receiver, a magnetometer, a tachometer, an inertial measurement unit (IMU), or the like, or a combination thereof.

In an example embodiment, the first apparatus 210 and the second apparatus 220 may be located at locations apart from each other by a certain distance inside the environment 200 to efficiently search for the environment 200, and may explore their surroundings. In such a case, the first apparatus 210 and the second apparatus 220 may move their surroundings to create a first local map 212 and a second local map 222, respectively. Specifically, the first apparatus 210 may identify information about a location or pose measured by the pose (or attitude) measuring sensor, identify information about a distance to the obstacle or terrain measured by the range sensor, converge the location or pose information and the distance information, and create the first area map 212 including information about the obstacle or terrain in the environment 200. Similarly, the second apparatus 220 may identify information about a location or pose measured by the pose (or attitude) measuring sensor, identify information about a distance to the obstacle or terrain measured by the range sensor, converge the location or pose information and the distance information, and create the second area map 222 including information about the obstacle or terrain in the environment 200. In an example embodiment, the first local map 212 and the second local map 222 may be an occupancy grid map. In an example embodiment, the first local map 212 and the second local map 222 may be two-dimensional or three-dimensional maps.

The first local map 212 and the second local map 222 represent the obstacle, the terrain and the like that present in different portions in the environment 200. Thus, the first local map 212 and the second local map 222 may be merged to create a single map. In this case, since the first local map 212 and the second local map 222 are created by the first apparatus 210 and the second apparatus 220, respectively, reference points or coordinate axes of each local map may differ from each other. Therefore, it is necessary to know a relationship between the local maps or the apparatuses. Accordingly, the first apparatus 210 may acquire an image 214 of the second apparatus 220 using an image sensor. The image sensor may acquire the image 214 of the second apparatus 220 by taking a photo or video of the second apparatus 220 or the second platform including the second apparatus 220. For example, the image 214 of the second apparatus 220 may include all or part of an appearance of the second apparatus 220 or the second platform including the second apparatus 220. The image 214 of the second apparatus 220 may be a red-green-blue (RGB) image, a black-and-white image, a grayscale image, or the like.

In an example embodiment, the processor 110 may identify first information 211 and second information 221. The first information 211 may include the first local map 212, the pose 213 of the first apparatus 210 and the image 214 of the second apparatus 220. The second information 221 may include the second local map 222 and the pose 223 of the second apparatus 220. That is, the processor 110 may obtain information about the first local map 212 of the first apparatus 210, the pose 213 of the first apparatus 210 from the first local map 212, the second local map 222 of the second apparatus 220, the pose 223 of the second apparatus 220 from the second local map 222, and the image 214 about the second apparatus 220, which is obtained by the first apparatus 210.

In an example embodiment, the first information 211 and the second information 221 may be received from the first apparatus 210 and the second apparatus 220, respectively. In this case, the first apparatus 210, the second apparatus 220 and the electronic apparatus 100 may use a communication apparatus to transmit or receive respective pieces of information. For example, the communication apparatus may be configured with a wired communication module connected to the Internet or the like via a local region network (LAN), a mobile communication module connected to a mobile communication network via a mobile communication base station to transmit and receive data, a near field communication module using a wireless local area network (WLAN)-series communication scheme such as wireless fidelity (Wi-Fi), or a wireless personal area network (WPAN)-series communication scheme such as Bluetooth or Zigbee, a satellite communication module using a global navigation satellite system (GNSS) such as a global positioning system, or a combination thereof.

As illustrated in FIG. 2, based on the first information 211 about the first apparatus 210 and the second information 221 about the second apparatus 220, the processor 110 according to the present disclosure may converge respective pieces of information to create a merged map 232. In an example embodiment, the electronic apparatus 100 may be located at some distance from the first apparatus 210 and the second apparatus 220. In this case, the processor 110 may receive respective pieces of information from apparatuses such as a central server or a master of a centralized system, and create the merged map 232 therefrom. In another example embodiment, the electronic apparatus 100 may be included in the first apparatus 210 or the second apparatus 220. In still another example embodiment, the electronic apparatus 100 may be mounted on the first platform on which the first apparatus 210 is mounted or on the second platform on which the second apparatus 220 is mounted. In this case, a system including the respective apparatuses may have a configuration such as a decentralized system. In the centralized system as well as the decentralized system, the processor 110 may share the merged map 232 with the first apparatus 210 or the second apparatus 220 by using a separate communication apparatus.

In an example embodiment, the processor 110 may output the merged map 232. The map merging method according to the present disclosure uses a pre-trained artificial neural network. Thus, the computation cost is not large. Therefore, in an example embodiment, the processor 110 may output the merged map 232 in real time.

Figure 3:
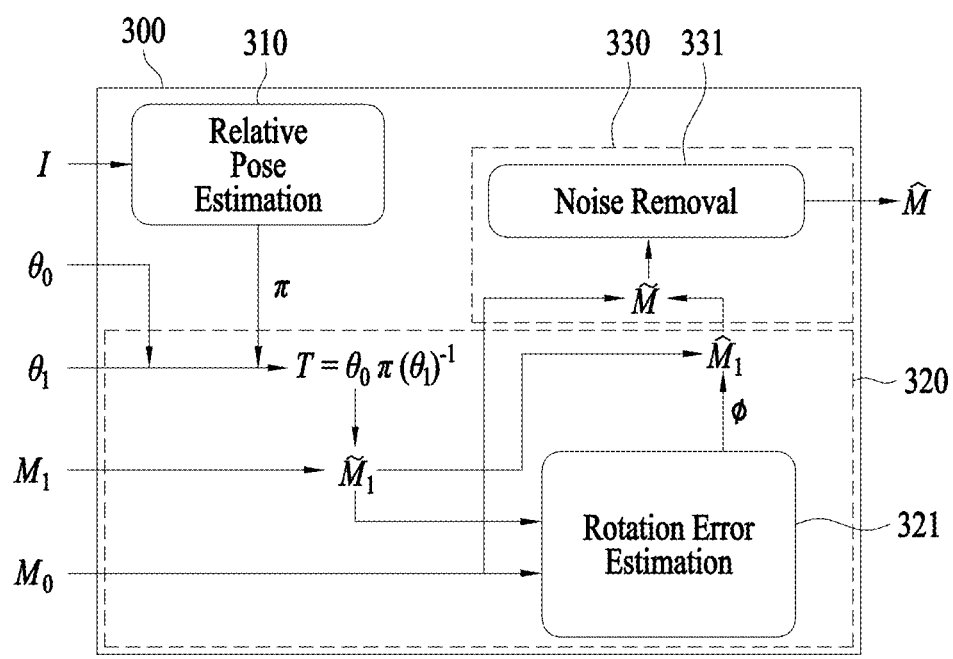
FIG. 3 illustrates a convergence and flow of information used in an example embodiment of the present disclosure.

FIG. 3 illustrates convergence and flow of information used in an example embodiment according to the present disclosure. A map merging block 300 means the map merging method performed by the processor 110 according to the example embodiment. A relative pose estimation block 310, a second local map correction block 320, a rotation error estimation block 321, a map merging block 330 and a noise removal block 331 mean some operations of the map merging method performed by the processor 110 according to the present example embodiment, respectively. For the sake of convenience in description, the operations are indicated by blocks, and will be described first in terms of input and output of information. A specific example embodiment of each operation will be described later.

Inputs used in the map merging method are indicated on the left side of the map merging block 300. Example of the inputs used in the map merging method may include a first local map $M_0$, a second local map $M_1$, a pose $\theta_0$ of a first apparatus in the first local map $M_0$, a pose $\theta_1$ of a second apparatus in the second local map $M_1$, and an image/of the second apparatus obtained by the first apparatus. Outputs used in the map merging method are displayed on the right side of the map merging block 300. The output used in the map merging method may include a merged map $\hat{M}$. In the example embodiment of FIG. 3, the first local map $M_0$ and the second local map $M_1$ may be two-dimensional maps. However, various example embodiments according to the present disclosure are not limited thereto.

The relative pose estimation block 310 may determine a relative pose $\pi$ of the second apparatus with respect to the first apparatus based on the image I. The relative pose $\pi$ may include a two-dimensional or three-dimensional location value, a rotation value, or a combination thereof. Here, the rotation value may be a value expressed by Euler angle or Quaternion. In the example embodiment described with reference to FIG. 3, since the first local map $M_0$ and the second local map $M_1$ are two-dimensional maps, the relative pose $\pi$ also includes a location value on a two-dimensional plane, and a rotation value measured with reference to a rotational axis perpendicular to the two-dimensional plane (for the sake of convenience in description, hereinafter referred to as a "rotation value").

Inputs to the second local map correction block 320 are the relative pose $\pi$, the first local map $M_0$, the second local map $M_1$, the pose $\theta_0$ of the first apparatus, and the pose $\theta_1$ of the second apparatus, and an output from the second local map correction block 320 is a corrected second local map $\hat{M}_1$. The pose $\theta_0$ of the first apparatus means a current pose of the first apparatus with respect to a reference pose of the first apparatus. The pose $\theta_1$ of the second apparatus means a current pose of the second apparatus with respect to a reference pose of the second apparatus. The reference pose of the first apparatus and the reference pose of the second apparatus may be an initial pose of the first apparatus and an initial pose of the second apparatus, respectively. In the second local map correction block 320, a transformation matrix T may be determined using Equation 1 below based on the relative pose $\pi$, the pose $\theta_0$ of the first apparatus, and the pose $\theta_1$ of the second apparatus.

$$T=\theta_0\pi(\theta_1)^{-1} \quad \text{[Equation 1]}$$

In Equation 1 above, the transformation matrix T is a matrix that maps the second local map $M_1$ to the first local map $M_0$. Theoretically, assuming that there is no error in the relative pose $\pi$, the pose $\theta_0$ of the first apparatus, and the pose $\theta_1$ of the second apparatus, the transformation matrix T may be a matrix that matches the origin and coordinate axis of the second local map $M_1$ to the origin and coordinate axis of the first local map $M_0$. However, since there is an error in the relative pose $\pi$, the pose $\theta_0$ of the first apparatus, and the pose $\theta_1$ of the second apparatus, which are actually measured, the transformation matrix T may be a matrix that transforms the origin and coordinate axis of the second local map $M_1$ to be similar to or close to the origin and coordinate axis of the first local map $M_0$.

In the second local map correction block 320, the second local map $M_1$ may be transformed based on the transformation matrix T so that a transformed second local map $\tilde{M}_1$ may be determined.

When the error of the "rotation value" included in the determined relative pose $\pi$ is large, the quality of the merged map may be significantly lowered. Thus, in the second local map correction block 320, an error $\phi$ of the rotation value may be determined based on the first local map $M_0$ and the transformed second local map $\tilde{M}_1$ by a rotation error estimation block 321. The error $\phi$ of the rotation value may include a value in which the transformed second local map $\tilde{M}_1$ may be additionally rotated with reference to the rotational axis perpendicular to the two-dimensional plane.

In the second local map correction block 320, the transformed second local map $\tilde{M}_1$ may be corrected based on the error $\phi$ of the rotation value to determine a corrected second local map $\hat{M}_1$ may be determined.

The map merging block 330 may merge the first local map $M_0$ and the corrected second local map $\hat{M}_1$ to each other, thus determining the merged map $\hat{M}$. In an example embodiment, the map merging block 330 may further include the noise removal block 331. In this case, the first local map $M_0$ and the corrected second local map $\hat{M}_1$ are connected to each other by the map merging block 330 to determine a connection map $\tilde{M}$. The noise removal block 331 may remove noise in the connection map $\tilde{M}$ to determine the merged map $\hat{M}$.

In the case in which the respective maps in this example embodiment are occupancy grid maps, the first local map $M_0$ and the corrected second local map $\hat{M}_1$ may have different values in regions or grids that overlap each other when the first local map $M_0$ and the corrected second local map $\hat{M}_1$ are connected to each other by the map merging block 330. For example, in specific overlapping grids, the first local map $M_0$ and the corrected second local map $\hat{M}_1$ may have a value "Occupied" and a value "Empty", respectively. In this case, the processor 110 may regard the value "Occupied" as having priority over the value "Empty" and may set the grid of the connection map $\tilde{M}$ to the value "Occupied". In a similar way, the processor 110 may regard the value "Empty" as having priority over a value "Unknown", and, when the first local map $M_0$ and the corrected second local map $\hat{M}_1$ have the value "Empty" and the value "Unknown", respectively, in the specific overlapping grids, may set the grid of the connection map $\tilde{M}$ to the value "Empty".

FIG. 4 illustrates an algorithm of an example embodiment according to the present disclosure. The algorithm will be described below by implementing the respective blocks illustrated in FIG. 3 in the form of an algorithm, and thus description of the contexts that overlap with those described with reference to FIG. 3 will be omitted according to an example embodiment, through the use of the algorithm illustrated in FIG. 4, the processor 110 may obtain, as input information 401, the first local map $M_0$, the second local map $M_1$, and the pose $\theta_0$ of the first apparatus in the first local map $M_0$, the pose $\theta_1$ of the second apparatus in the second local map $M_1$, and the image/of the second apparatus obtained by the first apparatus, and may output the merged map $\hat{M}$ as output information 402.

In Operation S410, the processor 110 may determine the relative pose c of the second apparatus with respect to the first apparatus based on the image I. Specifically, the processor 110 may determine the relative pose π of the second apparatus with respect to the first apparatus from the image/ using a first trained artificial neural network (ANN). More specifically, the first trained artificial neural network may include a first convolutional neural network (CNN) trained to process an image input thereto and output a relative pose of an apparatus with respect to an image sensor. For example, the first convolutional neural network may be trained to identify all or part of the appearance of the second apparatus from the image I, determine a pixel position on the image I, and determine a relative pose to the respective apparatus or a vehicle. To do this, it is necessary to use images obtained when viewed the apparatus or vehicle at various angles and distances in the course of training the first trained artificial neural network or the first convolutional neural network.

In Operation S420, the processor 110 may determine the transformation matrix T based on the relative pose π, the pose $\theta_0$ of the first apparatus, and the pose $\theta_1$ of the second apparatus using Equation (1) above.

In Operation S430, the processor 110 may transform the second local map $M_1$ based on the transformation matrix T to determine the transformed second local map $\tilde{M}_1$.

In Operation S440, the processor 110 may determine the error ϕ of the rotation value based on the first local map $M_0$ and the transformed second local map $\hat{M}_1$ In Operation S450, the processor 110 may correct the transformed second local map $\tilde{M}_1$ based on the error ϕ of the rotation value to determine the corrected second local map $\hat{M}_1$. Specifically, the processor 110 may determine the error ϕ of the rotation value based on the first local map $M_0$ and the transformed second local map $\tilde{M}_1$ using a second trained artificial neural network, and may correct the corrected second local map $\hat{M}_1$ based on the error ϕ of the rotation value. More specifically, the second trained artificial neural network may include a second convolutional neural network trained to process two local maps input thereto and output an error of a rotation value of at least one of the two local maps. To do this, it is necessary to use a map of an indoor environment in which the two local maps are correctly merged to each other in the course of training the second convolutional neural network.

In Operation S460, the processor 110 may connect the first local map $M_0$ and the corrected second local map $\hat{M}_1$ to determine the connection map $\tilde{M}$.

In Operation S470, the processor 110 may remove noise in the connection map $\tilde{M}$ to determine the merged map $\hat{M}$. Specifically, the processor 110 may remove noise in the merged map using a trained autoencoder. More specifically, the processor 110 may remove noise in the merged map by using a generative adversarial network (GAN) that improves the performance of the autoencoder in competition with a neural network that compares restored data and original data in the course of training the autoencoder. For example, the autoencoder is trained to make the restored data, which is a map in which the noise has been removed, similar to the original data, which is a noise-free map, as much as possible. In order to improve the performance of the autoencoder, a discriminator neural network that is trained to classify and sort the restored data and the origin data in the training course, may be used. That is, the autoencoder may be included in a generator neural network of the generative adversarial neural network, constitute the generative adversarial neural network together with the discriminator neural network, and be trained while competing with the discriminator neural network. In this case, the autoencoder may be trained until the discriminator neural network may pretend the discriminator neural network enough to classify the restored data as the original data with a sufficiently high probability.

In Operation S480, the processor 110 may output the merged map $\hat{M}$.

Figure 5:
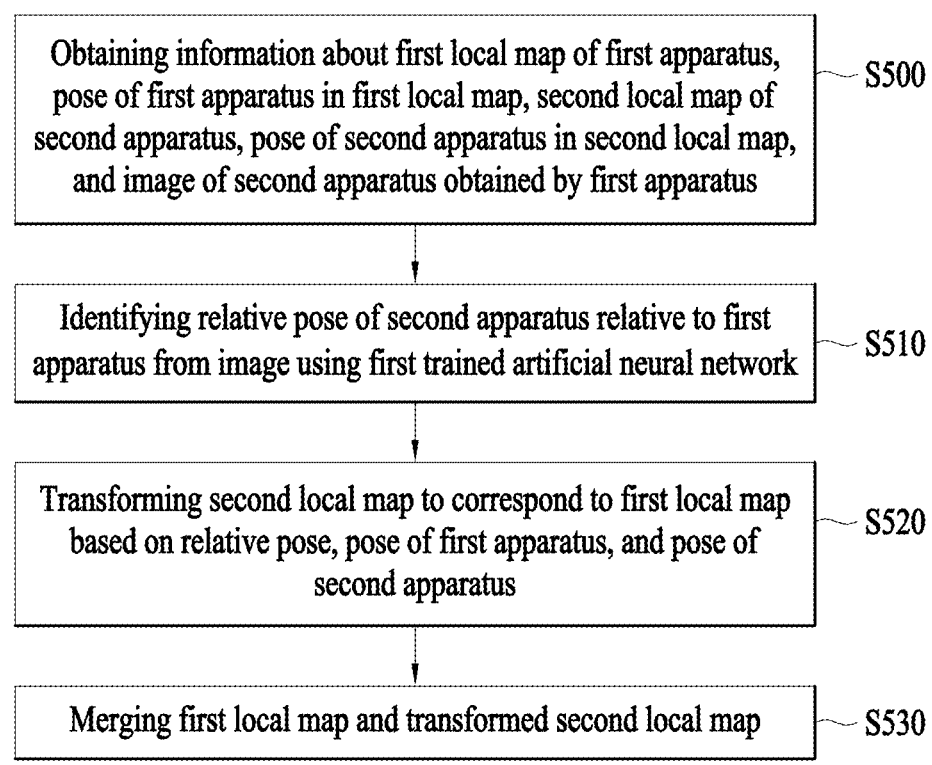
FIG. 5 illustrates an example embodiment of a method according to the present disclosure.

FIG. 5 illustrates a method of operating an electronic apparatus according to an example embodiment. Each operation of the method of FIG. 5 may be performed by the electronic apparatus 100 illustrated in FIG. 1, and thus description of the contexts that overlap with those described with reference to FIG. 1 will be omitted.

In Operation S500, the electronic apparatus 100 may obtain information about the first local map of the first apparatus, the pose of the first apparatus in the first local map, the second local map of the second apparatus, the pose of the second apparatus in the second local map, and the image of the second apparatus obtained by the first apparatus.

The first local map and the second local map may be occupancy grid maps.

In Operation S510, the electronic apparatus 100 may identify the relative pose of the second apparatus relative to the first apparatus from the image using the first trained artificial neural network.

The first trained artificial neural network may include the first convolutional neural network (CNN) trained to process the input image to output the relative pose of the apparatus with respect to the image sensor.

In Operation S520, the electronic apparatus 100 may transform the second local map to correspond to the first local map, based on the relative pose, the pose of the first apparatus, and the pose of the second apparatus.

The relative pose may include a rotation value with respect to a specific coordinate ax1s. Through the use of the second trained artificial neural network, the electronic apparatus 100 may determine the error of the rotational value based on the first local map and the transformed second local map, and correct the transformed second local map based on the error of the rotational value.

The second trained artificial neural network may include the second convolution neural network trained to process the first local map and the transformed second local map and output the error of the rotational value of the transformed second local map.

In Operation S530, the electronic apparatus 100 may merge the first local map and the transformed second local map.

The electronic apparatus 100 may merge the first local map and the corrected second local map.

The electronic apparatus 100 may remove noise in the merged map using the trained autoencoder.

The electronic apparatus 100 may remove the noise in the merged map using the generative adversarial network (GAN) that improves the performance of the autoencoder in competition with the neural network that compares the restored data and the original data in the course of training the autoencoder.

The electronic apparatus 100 may output the merged map in real time.

The present embodiments may be described in terms of functional block components and various processing steps. Such functional blocks may be realized by any number of hardware, software or a combination thereof configured to perform specified functions. For example, embodiments may employ various integrated circuit (IC) components, for example, memory elements, processing elements, logic elements, look-up tables, and the like, which may carry out a variety of functions under the control of one or more microprocessors or other control apparatuses. Similarly, where the constituent elements are implemented using software programming or software elements, the present embodiments may be implemented with any programming or scripting language such as C, C++, Java, an assembler, or the like, with the various algorithms being implemented with any combination of data structures, objects, processes, routines or other programming elements. Functional aspects may be implemented in algorithms that are executed on one or more processors. Furthermore, the embodiments described herein may employ techniques in the related art for electronics configuration, signal processing, data processing, a combination thereof, and the like.

What is claimed is:

1. A map merging method for an electronic apparatus, the map merging method comprising:
   obtaining information about a first local map of a first apparatus, a pose of the first apparatus in the first local map, a second local map of a second apparatus, a pose of the second apparatus in the second local map, and an image of the second apparatus obtained by the first apparatus;
   identifying a relative pose of the second apparatus relative to the first apparatus from the image using a first trained artificial neural network;
   transforming the second local map to correspond to the first local map based on the relative pose, the pose of the first apparatus, and the pose of the second apparatus, to align origin and coordinate axes of the second local map with those of the first local map; and
   merging the first local map and a transformed second local map transformed in the transforming the second local map to output a merged map,
   wherein the image is an image of the second apparatus obtained through an image sensor of the first apparatus,
   wherein the first trained artificial neural network includes a first convolutional neural network trained to process an image input thereto and output a relative pose of an apparatus with respect to an image sensor.

2. The map merging method of claim 1, wherein the merging the first local map and the transformed second local map includes removing noise in the merged map using a trained autoencoder.

3. The map merging method of claim 2, wherein the merging the first local map and the transformed second local map includes removing the noise in the merged map by using a generative adversarial network configured to improve a performance of the trained autoencoder in competition with a neural network that compares restored data and original data in a course of training the trained autoencoder.

4. The map merging method of claim 1, wherein the relative pose includes a rotation value with respect to a specific coordinate axis,
   the transforming the second local map includes determining an error of the rotation value based on the first local map and the transformed second local map, and correcting the transformed second local map based on the error of the rotation value using a second trained artificial neural network, and
   the merging the first local map and the transformed second local map includes merging the first local map and a corrected second local map corrected in the correcting the transformed second local map.

5. The map merging method of claim 4, wherein the second trained artificial neural network includes a second convolutional neural network trained to process the first local map and the transformed second local map and output the error of the rotational value of the transformed second local map.

6. The map merging method of claim 1, wherein the first local map and the second local map are occupancy grid maps.

7. The map merging method of claim 1, further comprising: outputting the merged map in real time.

8. An electronic apparatus comprising:
   a memory configured to store at least one program; and
   a processor configured to execute the at least one program having instructions for
   obtaining information about a first local map of a first apparatus, a pose of the first apparatus in the first local map, a second local map of a second apparatus, a pose of the second apparatus in the second local map, and an image of the second apparatus obtained by the first apparatus;
   identifying a relative pose of the second apparatus relative to the first apparatus from the image using a first trained artificial neural network;
   transforming the second local map to correspond to the first local map based on the relative pose, the pose of the first apparatus, and the pose of the second apparatus, to align origin and coordinate axes of the second local map with those of the first local map; and
   merging the first local map and a transformed second local map transformed in the transforming the second local map to output a merged map,
   wherein the image is an image of the second apparatus obtained through an image sensor of the first apparatus,
   wherein the first trained artificial neural network includes a first convolutional neural network trained to process an image input thereto and output a relative pose of an apparatus with respect to an image sensor.

9. A non-transitory computer-readable medium storing a program that causes a computer to execute a map merging method, the program having instructions for:
   obtaining information about a first local map of a first apparatus, a pose of the first apparatus in the first local map, a second local map of a second apparatus, a pose of the second apparatus in the second local map, and an image of the second apparatus obtained by the first apparatus;
   identifying a relative pose of the second apparatus relative to the first apparatus from the image using a first trained artificial neural network;
   transforming the second local map to correspond to the first local map based on the relative pose, the pose of the first apparatus, and the pose of the second apparatus, to align origin and coordinate axes of the second local map with those of the first local map; and
   merging the first local map and a transformed second local map transformed in the transforming the second local map to output a merged map,
   wherein the image is an image of the second apparatus obtained through an image sensor of the first apparatus, wherein the first trained artificial neural network includes a first convolutional neural network trained to process an image input thereto and output a relative pose of an apparatus with respect to an image sensor.

10. The non-transitory computer-readable medium of claim 9, wherein the merging the first local map and the transformed second local map includes removing noise in the merged map using a trained autoencoder.

11. The non-transitory computer-readable medium of claim 10, wherein the merging the first local map and the transformed second local map includes removing the noise in the merged map by using a generative adversarial network configured to improve a performance of the trained autoencoder in competition with a neural network that compares restored data and original data in a course of training the trained autoencoder.

12. The non-transitory computer-readable medium of claim 9, wherein the relative pose includes a rotation value with respect to a specific coordinate axis, the transforming the second local map includes determining an error of the rotation value based on the first local map and the transformed second local map, and correcting the transformed second local map based on the error of the rotation value using a second trained artificial neural network, and the merging the first local map and the transformed second local map includes merging the first local map and a corrected second local map corrected in the correcting the transformed second local map.

13. The non-transitory computer-readable medium of claim 12, wherein the second trained artificial neural network includes a second convolutional neural network trained to process the first local map and the transformed second local map and output the error of the rotational value of the transformed second local map.

14. The non-transitory computer-readable medium of claim 9, wherein the first local map and the second local map are occupancy grid maps.

15. The non-transitory computer-readable medium of claim 9, further comprising instructions for: outputting the merged map in real time.

\* \* \* \* \*